United States Patent
Dawson et al.

(10) Patent No.: US 10,592,284 B2
(45) Date of Patent: *Mar. 17, 2020

(54) SYSTEM AND METHOD TO CONTROL HEAT DISSIPATION THROUGH SERVICE LEVEL ANALYSIS

(71) Applicant: INTERNATIONAL BUSINESS MACHINES CORPORATION, Armonk, NY (US)

(72) Inventors: Christopher J. Dawson, Arlington, VA (US); Vincenzo V. Di Luoffo, Sandy Hook, CT (US); Rick A. Hamilton, II, Charlottesville, VA (US); Michael D. Kendzierski, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,633

(22) Filed: Jul. 31, 2018

(65) Prior Publication Data
US 2018/0336066 A1 Nov. 22, 2018

Related U.S. Application Data

(60) Continuation of application No. 15/215,655, filed on Jul. 21, 2016, now Pat. No. 10,073,717, which is a
(Continued)

(51) Int. Cl.
*G06F 9/48* (2006.01)
*G06F 9/50* (2006.01)
(Continued)

(52) U.S. Cl.
CPC .......... *G06F 9/4893* (2013.01); *G06F 1/3203* (2013.01); *G06F 1/329* (2013.01);
(Continued)

(58) Field of Classification Search
CPC ................................ G06F 9/4893; G06F 1/32
See application file for complete search history.

(56) References Cited

U.S. PATENT DOCUMENTS

| 5,613,114 A | 3/1997 | Anderson et al. |
|---|---|---|
| 5,893,905 A | 4/1999 | Main et al. |

(Continued)

OTHER PUBLICATIONS

Office Action in U.S. Appl. No. 16/055,693 dated Jul. 25, 2019, 9 pages.

(Continued)

*Primary Examiner* — Phil K Nguyen
(74) *Attorney, Agent, or Firm* — William Hartwell; Andrew M. Calderon; Roberts Mlotkowski Safran Cole & Calderon P.C.

(57) ABSTRACT

The system and method generally relate to reducing heat dissipated within a data center, and more particularly, to a system and method for reducing heat dissipated within a data center through service level agreement analysis, and resultant reprioritization of jobs to maximize energy efficiency. A computer implemented method includes performing a service level agreement (SLA) analysis for one or more currently processing or scheduled processing jobs of a data center using a processor of a computer device. Additionally, the method includes identifying one or more candidate processing jobs for a schedule modification from amongst the one or more currently processing or scheduled processing jobs using the processor of the computer device. Further, the method includes performing the schedule modification for at least one of the one or more candidate processing jobs using the processor of the computer device.

20 Claims, 5 Drawing Sheets

Related U.S. Application Data continuation of application No. 14/860,902, filed on Sep. 22, 2015, now Pat. No. 9,442,767, which is a division of application No. 14/510,155, filed on Oct. 9, 2014, now Pat. No. 9,219,657, which is a continuation of application No. 12/478,069, filed on Jun. 4, 2009, now Pat. No. 8,904,394.

(51) Int. Cl.
| | | |
|---|---|---|
| G06F 1/32 | (2019.01) | |
| G06F 1/329 | (2019.01) | |
| G06F 1/3203 | (2019.01) | |
| H04L 12/24 | (2006.01) | |
| G06F 1/3228 | (2019.01) | |
| G06F 1/26 | (2006.01) | |
| G06F 9/46 | (2006.01) | |

(52) U.S. Cl.
CPC .......... *G06F 1/3228* (2013.01); *G06F 9/4837* (2013.01); *G06F 9/4856* (2013.01); *G06F 9/5038* (2013.01); *G06F 9/5088* (2013.01); *G06F 9/5094* (2013.01); *H04L 41/5022* (2013.01); *G06F 1/26* (2013.01); *G06F 1/32* (2013.01); *G06F 9/466* (2013.01); *Y02D 10/24* (2018.01)

(56) References Cited

U.S. PATENT DOCUMENTS

| | | |
|---|---|---|
| 6,434,589 B1 | 8/2002 | Lin et al. |
| 7,222,245 B2 | 5/2007 | Singh |
| 7,865,382 B2 | 1/2011 | Menon et al. |
| 8,136,114 B1 | 3/2012 | Gailloux et al. |
| 8,510,737 B2 | 8/2013 | Kunjithapatham et al. |
| 8,539,493 B1 | 9/2013 | Robertson et al. |
| 2002/0194251 A1 | 12/2002 | Richter et al. |
| 2003/0135609 A1 | 7/2003 | Carlson et al. |
| 2003/0204758 A1 | 10/2003 | Singh |
| 2005/0021530 A1 | 1/2005 | Garg et al. |
| 2005/0165925 A1* | 7/2005 | Dan ..................... G06F 9/5083 709/224 |
| 2006/0026010 A1 | 2/2006 | van Moorsel et al. |
| 2006/0047808 A1 | 3/2006 | Sharma et al. |
| 2006/0149755 A1 | 7/2006 | Marshall et al. |
| 2006/0179196 A1 | 8/2006 | Gray |
| 2007/0083500 A1 | 4/2007 | Zibitsker |
| 2007/0089446 A1 | 4/2007 | Larson et al. |
| 2007/0180083 A1 | 8/2007 | Adam et al. |
| 2007/0204266 A1 | 8/2007 | Beaty et al. |
| 2007/0220517 A1 | 9/2007 | Lippett |
| 2007/0234090 A1 | 10/2007 | Merkin et al. |
| 2007/0240161 A1 | 10/2007 | Prabhakar et al. |
| 2007/0271475 A1 | 11/2007 | Hatasaki et al. |
| 2008/0059972 A1 | 3/2008 | Ding et al. |
| 2009/0100172 A1 | 4/2009 | Chen et al. |
| 2009/0106571 A1 | 4/2009 | Low et al. |
| 2009/0113434 A1 | 4/2009 | Podila |
| 2009/0119396 A1 | 5/2009 | Kanda |
| 2009/0265568 A1 | 10/2009 | Jackson |
| 2009/0287528 A1 | 11/2009 | Strickland et al. |
| 2009/0288092 A1 | 11/2009 | Yamaoka |
| 2009/0293022 A1 | 11/2009 | Fries |
| 2010/0050184 A1 | 2/2010 | Lin et al. |
| 2010/0115526 A1 | 5/2010 | Mincarelli |
| 2010/0153124 A1 | 6/2010 | Dasari et al. |
| 2011/0078695 A1* | 3/2011 | Agarwala ............... G06Q 10/06 718/104 |
| 2012/0011517 A1* | 1/2012 | Smith .................. G06F 11/3006 718/104 |

OTHER PUBLICATIONS

Notice of Allowance in U.S. Appl. No. 16/055,693 dated Nov. 20, 2019, 6 pages.

* cited by examiner

SYSTEM AND METHOD TO CONTROL HEAT DISSIPATION THROUGH SERVICE LEVEL ANALYSIS

FIELD OF THE INVENTION

The present invention generally relates to reducing heat dissipated within a data center, and more particularly, to a system and method for reducing heat dissipated within a data center through service level agreement analysis, and resultant reprioritization of jobs to maximize energy efficiency.

BACKGROUND

A traditional data center may conventionally include a plurality of individual computing resources in one open area having, e.g., four walls. A data center (or other physical space) beneficially has, where possible, an optimized heating and cooling infrastructure. Maintaining data centers at desired temperatures (e.g., set points) helps prevent computer hardware (e.g., information technology (IT) infrastructure) from overheating and malfunctioning. To this end, many data centers are cooled to relatively low temperatures (e.g., 65° F.) to increase equipment reliability and useful life, and to avoid downtime for repair and/or replacement.

Conventional cooling systems cool the entire data center to a temperature well below the set point so that IT equipment operating in the hot spots does not exceed the set point. In other words, existing cooling systems resort to a sort of 'overkill' by cooling the entire volume of the data center to well below the set point, which increases operational costs and wastes energy. Moreover, with the increasing awareness and desire to operate in a "green" manner, such excessive use of energy is undesirable.

A service level agreement (frequently abbreviated as SLA) is a part of a service contract where the level of service, e.g., for performing a process, is formally defined. In practice, the term SLA is sometimes used to refer to the contracted delivery time (of the service) or performance. For example, an SLA may be a negotiated agreement between two parties where one is the customer and the other is the service provider. The SLA can be a legally binding formal or informal "contract."

More specifically, the SLA may record a common understanding about, for example, services, priorities, responsibilities, guarantees and warranties. Each area of service scope may have the "level of service" defined. The SLA may specify the levels of availability, serviceability, performance, operation, or other attributes of the service such as billing. The "level of service" can also be specified as "target" and "minimum," which allows customers to be informed as to what to expect (the minimum), whilst providing a measurable (average) target value that shows the level of organization performance. In some contracts, penalties may be agreed in the case of non compliance of the SLA. The "agreement" relates to the services the customer receives, and not how the service provider delivers that service.

A data center may begin to process jobs, for example, once they are received by the data center and/or according to a scheduler. That is, for example, a data center may receive a number of processing jobs, e.g., three processing jobs. Moreover, the data center may begin processing these jobs upon receiving them.

However, while some of these jobs may need to be, for example, started right away and/or run at maximum capacity, in order to meet those jobs' SLAs, other jobs may have more time, while remaining in compliance with their respective SLAs, to complete the processing. That is, continuing with the above example, the SLAs for the first job may indicate that this job should be started right away and/or run at maximum capacity, in order to meet the SLA. However, the SLAs for the second and third jobs may indicate that these jobs may not need to be started right away and/or run at maximum capacity in order to maintain compliance with their respective SLAs.

Accordingly, there exists a need in the art to overcome the deficiencies and limitations described hereinabove.

SUMMARY

In a first aspect of the invention, a computer implemented method includes performing a service level agreement (SLA) analysis for one or more currently processing or scheduled processing jobs using a processor of a computer device. Additionally, the method comprises identifying one or more candidate processing jobs for a schedule modification from amongst the one or more currently processing or scheduled processing jobs using the processor of the computer device. Further, the method comprises performing the schedule modification for at least one of the one or more candidate processing jobs using the processor of the computer device.

In another aspect of the invention, a system comprises a service level agreement (SLA) analysis tool operable to perform a service level agreement (SLA) analysis for one or more currently processing or scheduled processing jobs of a data center, and identify one or more candidate processing jobs for a schedule modification from amongst the one or more currently processing or scheduled processing jobs. Additionally, the system comprises a scheduling tool operable to perform the schedule modification for at least one of the one or more candidate processing jobs.

In an additional aspect of the invention, a computer program product comprising a computer usable storage medium having readable program code embodied in the medium is provided. The computer program product includes at least one component operable to perform a service level agreement (SLA) analysis for one or more currently processing or scheduled processing jobs of a data center using a processor of a computer device to determine one or more processing jobs, from the one or more currently processing or scheduled processing jobs, which can be subject to a schedule modification without incurring an SLA violation. Additionally, the at least one component operable to identify one or more candidate processing jobs for the schedule modification from amongst the one or more currently processing or scheduled processing jobs and perform the schedule modification for at least one of the one or more candidate processing jobs. The schedule modification comprises at least one of: a delay of the one or more candidate processing jobs; a slowing of the one or more candidate processing jobs; and a relocation of the one or more candidate processing jobs.

In a further aspect of the invention, a computer system for controlling heat dissipation through a service level agreement (SLA) analysis comprises a CPU, a computer readable memory and a computer readable storage media. Additionally, the computer system comprises first program instructions to perform the service level agreement (SLA) analysis for one or more currently processing or scheduled processing jobs of a data center. Furthermore, the computer system comprises second program instructions to identify one or more candidate processing jobs for a schedule modification from amongst the one or more currently processing or scheduled processing jobs. Moreover, the computer system comprises third program instructions to perform the schedule modification for at least one of the one or more candidate processing jobs. The first, second and third program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
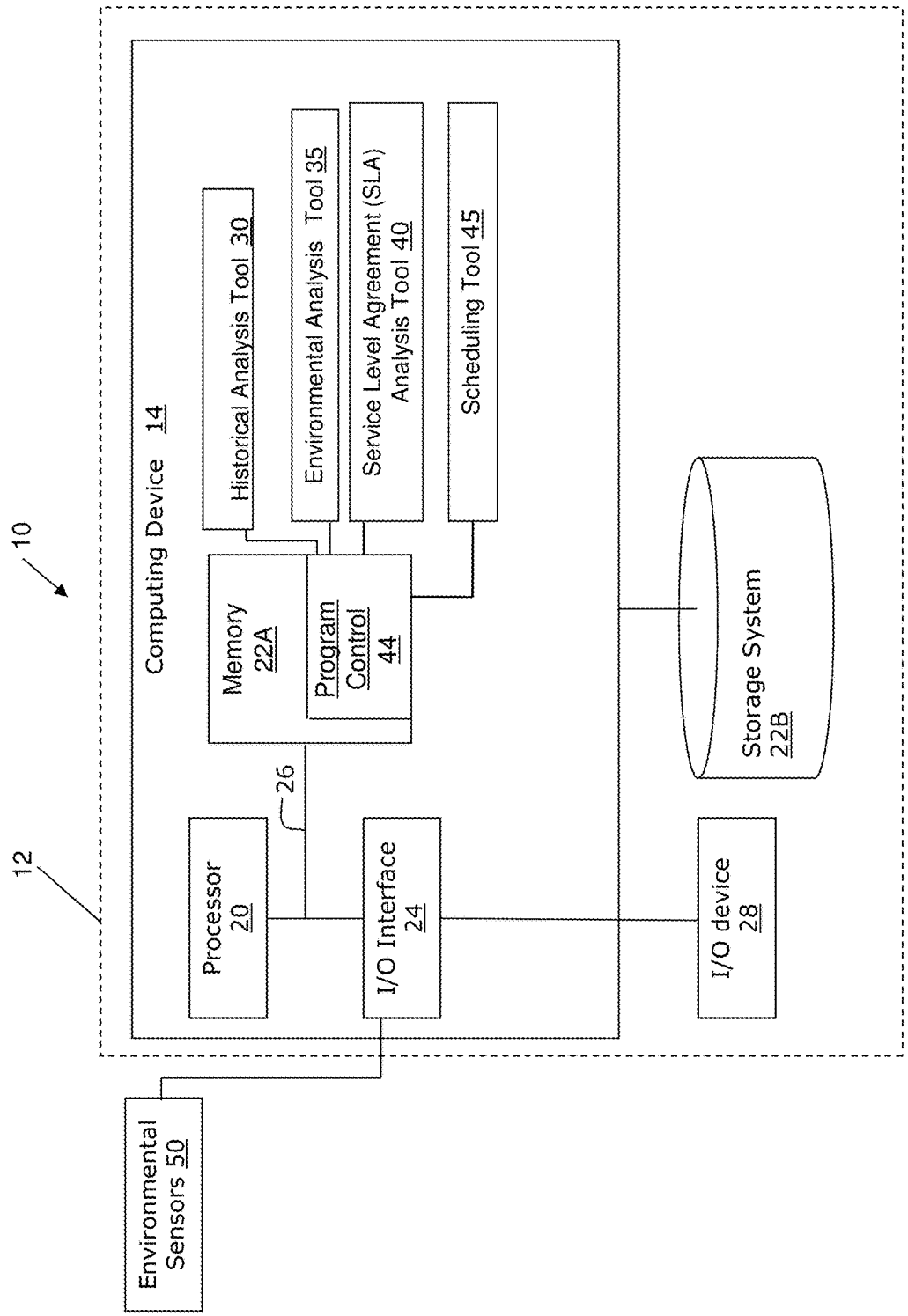
FIG. 1 shows an illustrative environment for implementing the steps in accordance with aspects of the invention.

The present invention generally relates to reducing heat dissipated within a data center, and more particularly, to a system and method for reducing heat dissipated within a data center through service level agreement analysis, and resultant reprioritization of jobs to maximize energy efficiency. By analyzing the service level agreements and application job schedules, the application workload of a data center may be scaled back (e.g., by not running the job at maximum speed) to reduce the heat and energy output within a data center while still meeting a SLA. For example, application jobs that have a lower priority (as indicated by the SLA) may be delayed for execution during known periods of maximum workload, when overall heat output may be a concern.

By implementing the present invention, unevenness (or burstiness) of jobs may be reduced so that periods of intense heat in the data center (which would require additional cooling, and thus, additional energy expenditure) are not unnecessarily produced. To reduce such burstiness, for example, low-priority jobs (which will increase the data center cooling requirements) may be run only when other jobs are not running (when the data center is cooler). In embodiments, this can include, for example, throttling back processor speeds of the computing resources performing the low-priority jobs or by delaying computations for the low-priority jobs until expected lower-utilized times.

By delaying these lower priority jobs, the present invention is operable to maintain the data center temperature as close to constant as possible. This smoothing of "heat loads" on the data center will result in lower data center cooling requirements and thus, will result in lower cooling costs.

Implementing the present invention allows for a data center to better utilize its resources by throttling the application workload managed by its service level agreement (SLA) target. An aim of the present invention is to conserve energy and computing power by recognizing the time of the application job, the SLA target for the job and the current environmental parameters, e.g., within the data center, so that lower priority jobs (e.g., as indicated by their respective SLAs) may, for example, be throttled-back to limit their energy usage but still meet their SLA targets.

By adhering to the SLA targets for the application workload, the application jobs within the data center may be, for example, delayed or otherwise throttled back to limit their energy usage and heat output. This may help reduce the heat output, control power consumption and heat dissipation within a data center by controlling the speed at which the jobs are processed. Using the SLAs as a guide, jobs may be delayed to run during times at which energy costs are lower (for example, at night) or when the environmental parameters of the data center are best suited for running their workload. By time-shifting, throttling and/or relocating workload based upon other computational workloads within a data center, the present invention is operable to smooth the heat characteristics within a given data center. Additionally, throttling back the processing power may reduce the costs to cool the data center and lengthen the mean-time to failure for critical systems that are affected by changes in heat, temperature and humidity.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, and/or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes an historical analysis (HA) tool 30, an environmental analysis (EA) tool 35, a service level agreement (SLA) analysis tool 40, and a scheduling tool 45, which are operable to determine data center historical conditions, determine data center environmental conditions (including data center processing conditions), determine SLA requirements for processing jobs, and schedule processing jobs based on the output of the HA tool 30, the EA tool 35 and the SLA analysis tool 40, e.g., the processes described herein. The HA tool 30, the EA tool 35, the SLA analysis tool 40 and the scheduling tool 45 can be implemented as one or more program code in the program control 44 stored in memory 22A, as separate or as combined single or multipurpose hardware modules. For example, the HA tool 30, the EA tool 35 and/or the SLA analysis tool 40 can also be a separate hardware device, such as a server, each having its own processor(s) as discussed herein. The HA tool 30, the EA tool 35 and/or the SLA analysis tool 40 can also be separate computing devices associated with one or more servers represented by server 12 of FIG. 1.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. The I/O device 28, for example, can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc. Moreover, as shown in FIG. 1 and explained further below, the computing device 14 is in communication with one or more environmental sensors 50.

In general, the processor 20 executes computer program code (e.g., program control 44), which can be stored in the memory 22A and/or storage system 22B. Moreover, in accordance with aspects of the invention, the program control 44 (having program code) controls the HA tool 30, the EA tool 35, the SLA analysis tool 40 and the scheduling tool 45. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Historical Analysis Tool

In embodiments, the historical analysis (HA) tool 30 is operable to determine a historical analysis of the processing jobs in a data center. For example, with a reoccurring job, the HA tool 30 may determine how long this job typically requires based on, for example, historical or other empirical data. Additionally, in embodiments, the HA tool 30 may, for example, determine a percentage of overall data center processing capacity a job, e.g., a reoccurring job, may typically require. For example, the HA tool 30 may determine that a given transaction processing job typically only runs around forty percent of overall data center capacity, e.g., using a statistical analysis.

In embodiments, the HA tool 30 may store historical data center usage in a database, e.g., storage system 22B (as shown in FIG. 1). Additionally, the percentages of overall data center processing capacity may be stored in a database, e.g., storage system 22B. Moreover, the HA tool 30 may access the stored historical data center usage information, for example, in order to determine how long a reoccurring job typically requires. Additionally, the HA tool 30 may access the stored historical data center usage information to estimate processing requirements for at least one currently processing or scheduled processing job.

Environmental Analysis Tool

According to an aspect of the invention, the environmental analysis (EA) tool 35 may be used to perform an environmental analysis of a data center. An environmental analysis of a data center is performed to determine, for example, the hot and cold zones and catalog the current environmental factors (temperature by zone, humidity, analysis of airflow, etc.). More specifically, a plurality of environmental sensors 50 may be located throughout the data center. In embodiments, the plurality of environmental sensors 50 may include indoor temperature sensors, outdoor temperature sensors, airflow sensors and humidity sensors, amongst other environmental sensors known to those of skill in the art. Moreover, in embodiments, the environmental sensors 50 may be, for example, evenly spaced throughout the data center. In embodiments, the environmental sensors 50 may be located in known data center hot spots. For example, in embodiments, the environmental sensors 50 may be located on the ceiling of the data center, the floor of the data center and/or the walls of the data center (e.g., at differing elevations in the walls of the data center).

The EA tool 35 may receive real-time environmental, e.g., temperature and/or humidity, readings from the plurality of environmental sensors 50. In embodiments, the EA tool 35 may determine average temperatures for regions of the data center based on the real-time temperature readings from the plurality of environmental sensors 50. Moreover, based on the real-time temperature readings, the EA tool 35 can determine an environmental analysis of the data center. For example, the EA tool 35 can determine regions of the data center that are very hot, e.g., regions having a number of currently operating computer resources, and regions of the data center that are very cool, e.g., regions in which no computer resources are currently operating. The EA tool 35 can also determine air flow paths, e.g., hot air flow paths, based on the real-time temperature readings from the plurality of environmental sensors 50. For example, the EA tool 35 can utilize the real-time temperature readings to determine, for example, upon activation of a computer resource, the flow path of hot air traveling from the computer resource in the data center.

The EA tool 35 may access a job schedule (e.g., stored in storage system 22B), such that the EA tool 35 is aware of scheduled jobs for the different computing resources of the data center. Furthermore, the EA tool 35 may determine current percentages of overall data center processing capacity particular processing jobs are currently requiring, e.g., in real time. In embodiments, the EA tool 35 is also operable to determine environmental conditions of other data centers. For example, the EA tool 35 may receive environmental conditions of other data centers in order to determine whether one or more of the other data centers would be suitable for a processing job relocation, as discussed further below.

Service Level Agreement Analysis Tool

According to further aspects of the invention, the service level agreement (SLA) analysis tool 40 is operable to examine SLAs for the one or more processing jobs, e.g., currently processing jobs and/or pending jobs. SLAs for the data center processing jobs, e.g., currently processing jobs and/or pending jobs, may be stored in a database, e.g., storage system 22B. The SLA analysis tool 40 is operable to access the database to examine the SLAs and to determine those jobs (or applications) that may, for example, be delayed, slowed and/or relocated while still meeting their respective SLAs. For example, if an application has an SLA target to finish within two hours, but would likely finish within one hour based on the current data center loading and CPU clock speed (as determined from the HA tool 30 and/or the EA tool 35), then the SLA analysis tool 40 may determine that the application is a candidate for delay or slowing, e.g., CPU clock speed reduction. That is, continuing to execute the job may result in a short term temperature increase of the data center. Thus, as described further below, the infrastructure running the application job may be throttled back to complete the workload within the two hours, by slowing and/or delaying processing on the underlying IT infrastructure. The slowing and/or delaying ensures that maximized energy efficiencies and reduced 'burstiness' occurs during the job duration.

In other words, the present invention is operable to throttle back workload for lower priority job workloads to maximize the energy efficiencies within a data center. As opposed to running the application workload or job at full-speed and as fast as possible, as long as the SLAs are met, the present invention may throttle back the capacity to lower energy consumption while still maintaining the SLA targets for the application.

According to an aspect of the invention, the SLA analysis tool 40 is operable to check the application job SLAs to determine a scheduled completion time of the job. In embodiments, the SLA analysis tool 40 may determine the application job SLAs before execution of the application job. Additionally, in embodiments, the SLA analysis tool 40 is operable to determine the application job SLAs during execution, e.g., in real time.

According to an exemplary embodiment, the SLA analysis tool 40 may assign a numerical value, e.g., between 1-7 based on priority of the application's SLAs. Applications having a job priority value of, for example, between 4-7 may be candidates to participate in the throttling of workloads. For example, if an application has an SLA requiring job completion in ten hours when the job historically takes nine hours (e.g., based on historical data, for example, as determined by the HA tool 30), the SLA analysis tool 40 may assign the application a numerical value (e.g., a throttle/delay numerical value) of 1, indicating that the application is not a candidate for the throttling of workloads. That is, with this example, there is not much excess time (9 hours–8 hours=1 hour) for delaying or slowing of this application.

However, with another example, an application may have an SLA indicating a required job completion in twenty-four hours when the job historically takes two hours (e.g., based on historical data, for example, as determined by the HA tool 30). The SLA analysis tool 40 may assign the application a numerical value of 6, indicating that the application is a candidate for the throttling of workloads. Additionally, the SLA analysis tool 40 may rank the applications (e.g., currently processing and pending applications) according to their respective numerical value(s). Moreover, as discussed further below, in embodiments, the scheduling tool 45 may select those application candidates for, e.g., delaying, slowing and/or relocating, based on their respective numerical value(s), e.g., with those applications having the highest rank (e.g., 7 with the example set forth above) being selected for delaying, slowing and/or relocating prior to applications with lower numerical values.

In an exemplary non-limiting embodiment, the SLA analysis tool 35 may determine a numerical value for an application by determining the ratio of time required (as indicated by, for example, the HA tool 30) to the time remaining (as indicated by the SLA). For example, with the first above example, the ratio is 9 hours/10 hours=0.90. With the second above example, the ratio is 2 hours/24 hours=0.083. Furthermore, the SLA analysis tool 40 may access a database, e.g., storage system 22B (as shown in FIG. 1) containing predetermined ranges of ratios with their respective corresponding numerical values. The predetermined ranges of ratios may be modified and/or updated by, for example, a user or service provider, amongst others.

In a further embodiment, data centers located, for example, in different locations, climates and/or geographical regions, may have different energy costs at any given time. For example, if a data center is in a hot climate, e.g., on a particularly hot day, when energy demand, and thus, energy costs, are relatively high for that data center, cooling costs for that data center may be lowered by relocating one or more processing jobs to another data center. Thus, with a further aspect of the invention, the SLA analysis tool 40 may examine SLAs with regard to where (e.g., at what data center or where in the world) the job processing occurs. For example, a processing job application may have an SLA that requires that the processing job be performed at a particular data center. Alternatively, another processing job may have an SLA that may, for example, specify a particular geographic region or may not have any requirements with regard to the location of the job processing. Accordingly, the SLA analysis tool 40 is further operable to examine SLAs for any requirements with regard to where a particular processing job occurs.

Based on the examination, the SLA analysis tool 40 is also able to assign a numerical value based on whether a particular job may be processed at a different data center, while still meeting the SLA for that job processing application. Expanding on the immediately above example, the SLA analysis tool 40 may assign the first processing job a numerical value (e.g., a relocation numerical value) of 1, as this processing job must be performed at this particular data center, and thus is not a candidate for processing job relocation. Furthermore, the SLA analysis tool 40 may identify a processing job having an SLA indicating no job location constraints for the processing job. Thus, the SLA analysis tool 40 may assign this processing job a numerical value of 7, indicating that this job is an excellent candidate for job relocation, while still maintaining the processing job's SLAs.

By reviewing the SLAs of applications, e.g., currently processing and/or scheduled to be processed by a data center, the SLA analysis tool 40 can identify those applications (e.g., processing jobs) that, based on their respective SLAs, may be candidates for, e.g., delaying slowing and/or relocation. In embodiments, the SLA analysis tool 40 may forward the identified candidates to the scheduling tool 45, described further below.

Scheduling Tool

According to aspects of the invention, the scheduling tool 45 is operable to maximize the energy efficiency of a data center by, for example, throttling back the application job workload as adjusted by its service level targets. The scheduling tool 45 may throttle back the application job workload for a data center by, for example, delaying, slowing and/or relocating one or more currently processing and/or scheduled jobs for the data center.

The scheduling tool 45 may determine whether to delay those lower priority jobs (e.g., as identified as the SLA analysis tool 45) until high priority jobs have finished. Reducing concurrent data center processing will result in lower heat output of the data center, and consequently lower cooling requirements and costs.

Additionally, the scheduling tool 45 may determine whether to slow one or more jobs which has been identified as a candidate for slowing by the SLA analysis tool 40 (e.g., will complete ahead of schedule may be slowed by, e.g., reducing CPU clock speed, while the SLA associated with the lower priority job is not violated). Long running jobs that may be delayed without affecting an SLA may, for example, be slowed, or throttled back, through the use of slowing CPU clock speeds to reduce the energy requirements for the application workload. By the scheduling tool 45 reducing clock speeds of those jobs that will complete ahead of schedule (e.g., based on the HA tool 30), lower heat output of the data center will result. For example, instead of running a job at maximum capacity for a short duration, the scheduling tool 45 may dictate that the application job may be extended for a longer period of time at a lower capacity in order to reduce the heat output and energy usage.

Furthermore, the scheduling tool 45 may determine whether to relocate jobs (e.g., determined by the SLA analysis tool 40 as candidates for relocation), e.g., to another region of the data center or another data center, in order to reduce the heat output and energy usage. In embodiments, the scheduling tool 45 may also utilize more efficient servers in the process or route workload to systems in a cooler part of the data center. Reducing concurrent data center processing, excessive processing on servers in a hotter region of a data center and/or processing on inefficient servers, for example, will result in lower heat output of the data center, and consequently lower cooling requirements and costs.

In embodiments, along with the application job priority, for example, in order to select one or more applications for relocation, e.g., within the data center and/or to another data center, the scheduling tool 45 may also account for the data center's average temperature, the location of the physical systems and/or the current power consumption. The scheduling tool 45 may review the application priority (as determined by the SLA analysis tool 40), mean temperature of the data center environmental parameters (as determined by the EA tool 35 and/or environmental sensors 50) and run time (as determined by the HA tool 30) to determine if a particular job may be a candidate and participant in an application job workload throttling to reduce energy needs and costs.

According to further aspects of the invention, the scheduling tool 45 is operable to invoke application job workload throttling whenever possible based on maintaining respective SLAs of current and pending processing jobs. In additional embodiments, the scheduling tool 45 may invoke application job workload throttling based on real time job processing conditions (e.g., as determined by the EA tool 35). For example, if the EA tool 35 determines that a predetermined, user-configurable threshold has been met or exceeded (e.g., a temperature threshold, a humidity threshold, a processing threshold and/or a power draw threshold, amongst other thresholds), the scheduling tool 45 may delay a lower priority batch job until the observed level drops below a predefined level. Additionally, for example, if the EA tool 35 determines a transaction job (e.g., an OLAP/OLTP job) is above some critical level, e.g., a given transaction processing job is running at 70% of capacity and it typically only runs around 40% capacity (e.g., as determined by the HA tool 30), the scheduling tool 45 may delay a lower priority batch job until the transaction job drops below a predefined level.

Online analytical processing, or OLAP, is an approach to quickly answer multi-dimensional analytical queries. The typical applications of OLAP are, for example, in business reporting for sales, marketing, management reporting, business process management (BPM), budgeting and forecasting, financial reporting and similar areas. Online transaction processing, or OLTP, refers to a class of systems that facilitate and manage transaction-oriented applications, typically for data entry and retrieval transaction processing.

Exemplary Analysis

Figure 2:
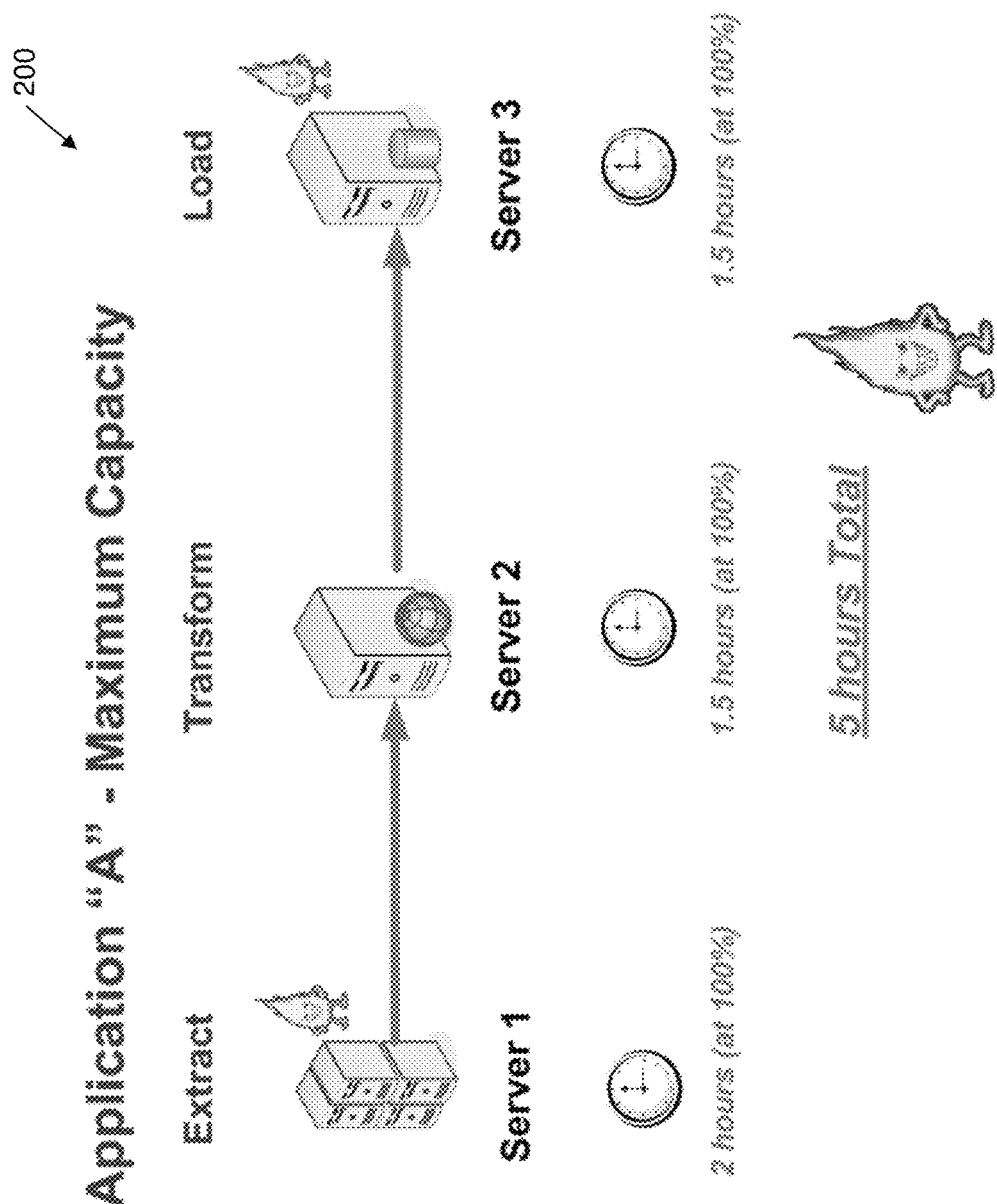
FIG. 2 shows an exemplary depiction of an application job scheduled within the data center processed at maximum capacity.
Figure 3:
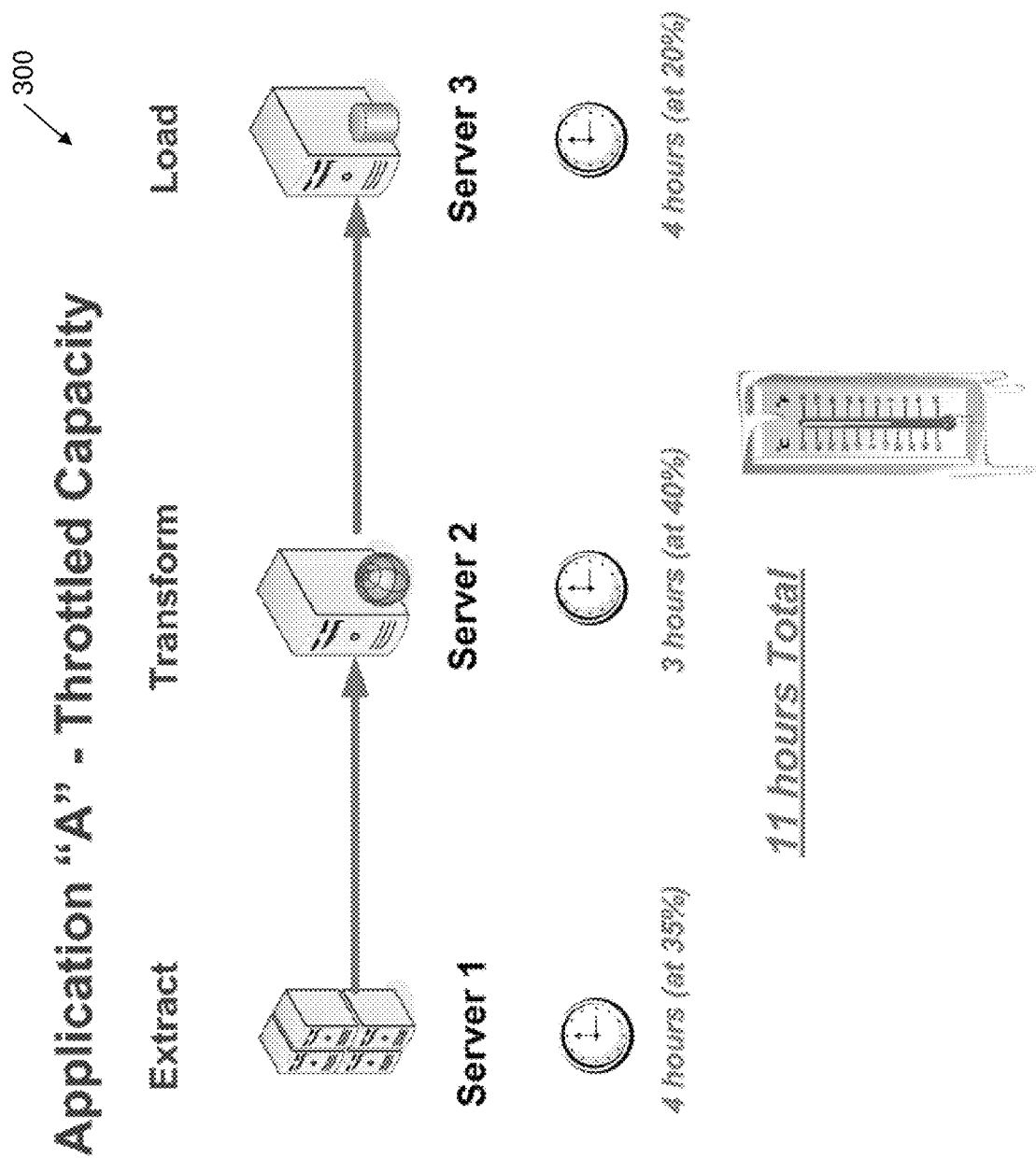
FIG. 3 shows an exemplary depiction of an application job scheduled within the data center processed at throttled capacity in accordance with aspects of the invention.

FIGS. 2 and 3 show exemplary depictions of a long-running application job, e.g., that is about to be scheduled within the data center, processed at maximum capacity (as shown in FIG. 2) and at throttled capacity (as shown in FIG. 3) in accordance with aspects of the invention. Long-running jobs may be characterized, for example, by any application job that may take longer than 30 minutes to complete based on average run time. With this illustrative, non-limiting example, the job characteristics are as follows:

Average Run Time: 5 hours (e.g., as determined by the HA tool 30)

SLA Target: 12 hours (e.g., as determined by the SLA analysis tool 40)

Application Priority—"5" (e.g., as determined by the SLA analysis tool 40)

Application Use Case: ETL (Extract, Transform, Load)

Systems Involved: (Extract—Server 1, Transform—Server 2, Load—Server 3)

As shown in FIG. 2, if the job (e.g., application "A") is executed at maximum capacity, the job will complete in 5 hours. That is, two hours on server 1 operating at 100% capacity, one and one-half hours on server 2 operating at 100% capacity and one and one-half hours on server 3 operating at 100% capacity. As should be understood, processing the job at maximum capacity generates excessive heat, which requires additional cooling capacity, and thus, increased cooling costs.

As shown in FIG. 3, when the job (e.g., application "A") is executed at throttled capacity, in accordance with aspects of the invention, the job will complete in 11 hours. As can be observed, completing the job in 11 hours will still be in compliance with the SLA, which requires job completion within 12 hours. Thus, the scheduling tool 45 schedules the extract process to run for four hours on server 1 operating at 35% capacity, the transform process to run for three hours on server 2 operating at 40% capacity and the load process to run for four hours on server 3 operating at 20% capacity. As should be understood, by executing the job (e.g., application "A") at throttled capacity, excessive heat, which requires additional cooling capacity, is avoided, thus decreasing cooling costs.

Based on the criteria outlined above, the job is executed at a reduced capacity and will be finished in 11 hours versus the previous 5 hours. At the end of 11 hours, the application job is completed. Using the reduction of CPU and heat capacity, the application job has improved the energy efficiencies of the data center and still meets the SLA targets. Calculating the energy improvements and monitoring the environmental factors of the data center, the application job may determine the energy improvements and cost savings by throttling back the infrastructure resources. By time-shifting, throttling and/or relocating workload based upon other computational workloads within a data center, the present invention is operable to smooth the heat characteristics within a given data center.

Flow Diagrams

Figure 4:
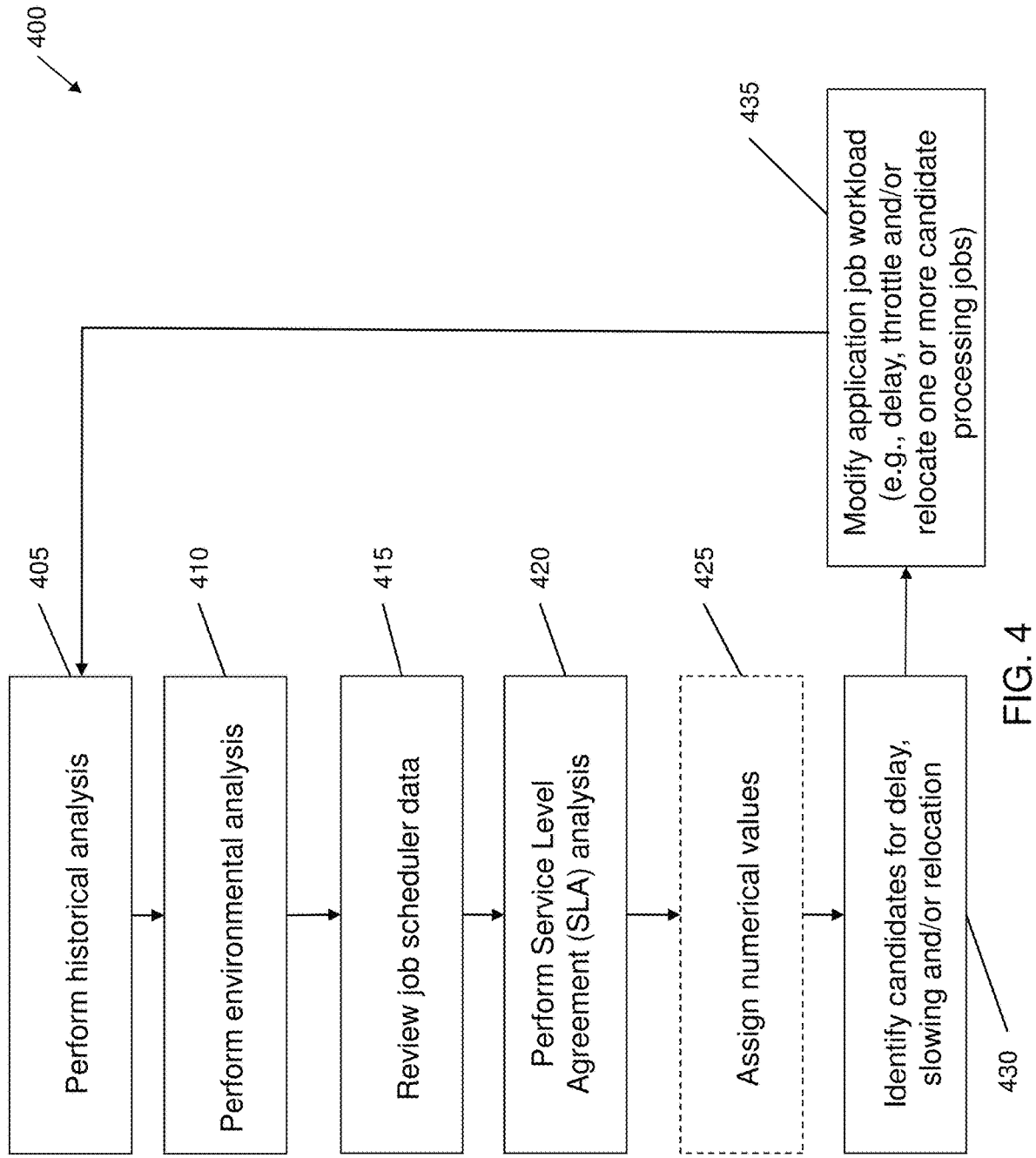
FIGS. 4 and 5 show exemplary flows in accordance with aspects of the invention.
Figure 5:
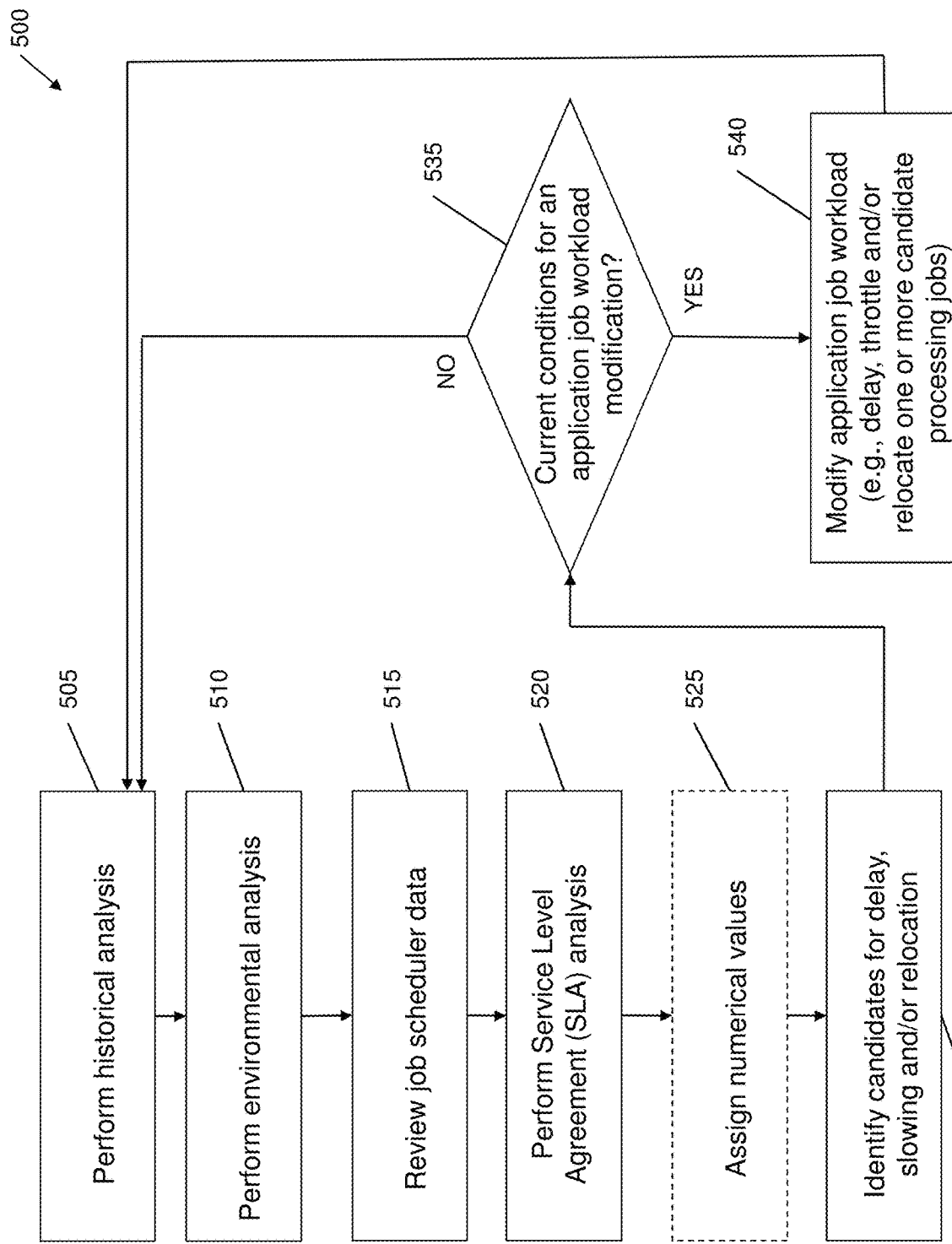

FIGS. 4 and 5 show exemplary flows for performing aspects of the present invention. The steps of FIGS. 4 and 5 may be implemented in the environment of FIG. 1, for example. The flow diagrams may equally represent high-level block diagrams of the invention. The flowcharts and/or block diagrams in FIGS. 4 and 5 illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 4 shows an exemplary flow 400 in accordance with aspects of the invention. At step 405, the HA tool performs a historical analysis of the data center. In embodiments, the historical analysis may include reviews of historical application processing and/or determinations of typical processing times for applications, amongst other analyses. At step 410, the EA tool performs an environmental analysis of the data center. In embodiments, the environmental analysis may include a determination of current environmental conditions, including temperature levels, humidity levels, processing levels, hot spot locations, amongst other environmental conditions. At step 415, the EA tool reviews the job scheduler data (e.g., accesses a database containing the job scheduler data) to determine currently scheduled (e.g., upcoming) processing jobs. While steps 405, 410 and 415 have been shown as sequential steps, the invention contemplates that these steps may occur concurrently and constantly, updating, for example, in real time.

At step 420, the SLA analysis tool performs a service level agreement (SLA) analysis for one or more currently processing and/or upcoming jobs. In embodiments, the SLA analysis may include a determination of SLAs for the one or more currently processing and/or upcoming jobs, which may include agreements pertaining to, for example, time requirements, location requirements and/or certification requirements, amongst other agreements. At optional step 425 (as indicated by the dashed lines), the SLA analysis tool assigns a numerical value to one or more currently processing and/or upcoming jobs. In embodiments, the numerical value may be, for example, a throttle/delay numerical value and/or a relocation numerical value. At step 430, the SLA analysis tool identifies one or more candidate job processing applications for, e.g., delay, slowing and/or relocation based on the SLA analysis.

At step 435, the scheduling tool modifies the job workload for a data center by modifying the schedule of one or more candidate application processing jobs, e.g., delay, slowing and/or relocating the job. Subsequent to step 435, the process returns to step 405.

FIG. 5 shows an exemplary flow 500 in accordance with aspects of the invention. Steps 505-530 of FIG. 5 correspond to steps 405-430 of FIG. 4 discussed above. At step 535, the scheduling tool determines whether current conditions are suitable for an application workload modification. In embodiments, the scheduling tool may determine that current conditions are suitable for an application workload modification, for example, based on current data center environmental conditions, e.g., excessive temperature, local hot spots, large power draws and/or large current processing loads, amongst other environmental conditions (for example, levels beyond one or more user-configurable thresholds).

If, at step 535, the scheduling tool determines that the current conditions are not suitable for an application job workload modification, the process returns to step 505. If, at step 535, the scheduling tool determines that the current conditions are suitable for an application job workload modification, at step 540, the scheduling tool modifies the job workload for a data center by modifying the schedule of one or more candidate application processing jobs, e.g., delay, slowing and/or relocating the job. Subsequent to step 540, the process returns to step 505.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system, comprising:
 a service level agreement (SLA) analysis tool operable to:
 perform a service level agreement (SLA) analysis for one or more currently processing or scheduled processing jobs of a data center using a processor of a computer device to determine one or more processing jobs, from the one or more currently processing or scheduled processing jobs, which can be subject to a schedule modification without incurring an SLA violation, the performing the SLA analysis comprising:
  identifying one or more candidate processing jobs for the schedule modification from amongst the one or more currently processing or scheduled processing jobs;
  determining a scheduled completion time for each of the one or more candidate processing jobs according to an SLA;
  assigning first numerical values to each of the one or more candidate processing jobs based on whether each of the one or more candidate processing jobs can be processed in a different data center according to the SLA; and
  ranking each of the one or more candidate processing jobs according to the first numerical values; and
 perform the schedule modification for at least one of the one or more candidate processing jobs based on the SLA analysis and a historical analysis comprising analyzing an amount of time used to process previous processing jobs.

2. The system of claim 1, wherein the schedule modification comprises at least one of:
   a delay of the one or more candidate processing jobs;
   a slowing of the one or more candidate processing jobs; and
   a relocation of the one or more candidate processing jobs from a first location to a second location.

3. The system of claim 2, wherein the slowing of the one or more candidate processing jobs comprises slowing one or more processor speeds of processors performing the one or more candidate processing jobs.

4. The system of claim 2, wherein the relocation of the one or more candidate processing jobs comprises relocating at least one of the one or more candidate processing jobs to at least one of:
   a cooler region of the data center;
   another data center; and
   a different climatic region having a different data center.

5. The system of claim 1, wherein the service level agreement (SLA) analysis tool is further operable to perform a historical analysis of the data center comprising analyzing an amount of time used to process previous processing jobs, wherein the historical analysis comprises estimating an amount of time required for completing the one or more candidate processing jobs.

6. The system of claim 1, wherein the service level agreement (SLA) analysis tool is further operable to perform an environmental analysis of the data center, wherein the environmental analysis comprises determining an average temperature for regions of the data center.

7. The system of claim 1, wherein the service level agreement (SLA) analysis tool is further operable to determine humidity levels of the data center and air flow paths of the data center.

8. The system of claim 6, wherein the service level agreement (SLA) analysis tool is further operable to determine and at least one of:
   current environmental conditions of the data center;
   temperature levels of the data center;
   processing levels of the data center;
   hot spot locations within the data center; and
   current environmental conditions of one or more other data centers.

9. The system of claim 8, wherein the current environmental conditions include at least one of temperature, local hotspots, power draws and current processing loads.

10. The system of claim 1, further comprising analyzing job scheduler data.

11. The system of claim 1, wherein the performing the SLA analysis comprises determining one or more processing jobs, from the one or more currently processing or scheduled processing jobs, which can be subject to the schedule modification without incurring an SLA violation.

12. The system of claim 1, wherein the service level agreement (SLA) analysis tool is further operable to:
   assign second numerical values to each of the one or more candidate processing jobs based on whether each of the one or more candidate processing jobs can be processed in a different data center according to the SLA; and
   rank each of the one or more candidate processing jobs according to the first numerical values and the second numerical values.

13. The system of claim 1, wherein the system is comprised of at least one of one or more processors within the computer device and one or more independent computer devices.

14. The system of claim 1, wherein the performing the schedule modification comprises transforming data representative of a job processing schedule to data representative of a modified job processing schedule.

15. The system of claim 1, wherein the historical analysis includes estimating an amount of time required for completing the one or more candidate processing jobs.

16. The system of claim 1, wherein the historical analysis includes determining historical processing requirements for reoccurring processing jobs.

17. The system of claim 1, wherein performing the schedule modification is further based on an environmental analysis of the data center.

18. The system of claim 17, wherein the environmental analysis comprises determining an average temperature of regions of the data center.

19. The system of claim 18, wherein the environmental analysis further comprises determining humidity levels of the regions of the data center.

20. The system of claim 19, wherein the environmental analysis further comprises determining air flow paths of the regions of the data center.

\* \* \* \* \*